*E. Clark.*
*Sausage Meat Cutter.*
N°. 3,723.        Patented Aug. 31, 1844.
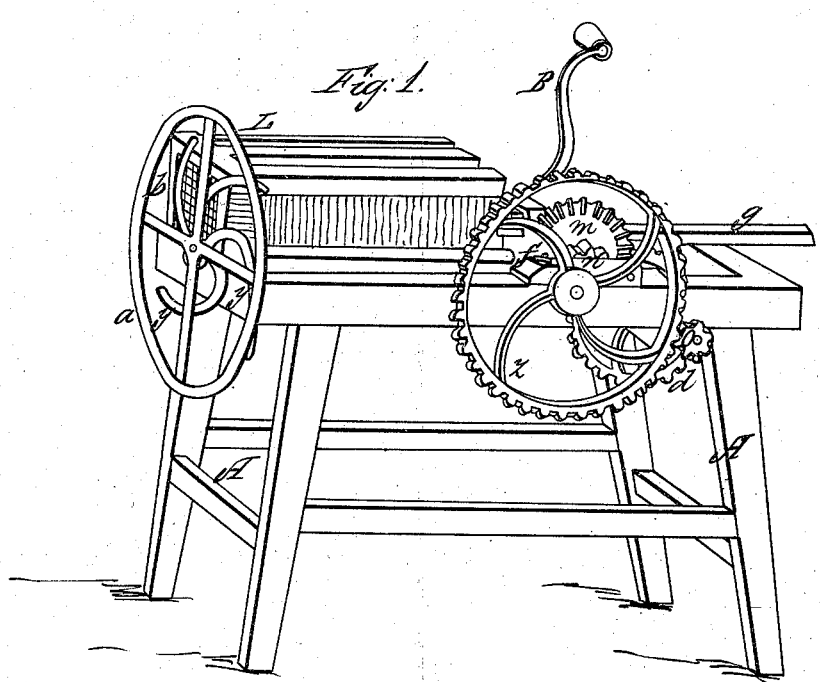
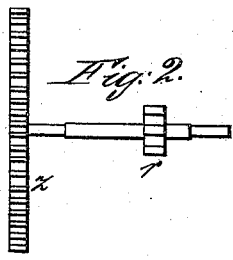
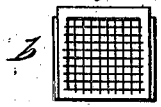
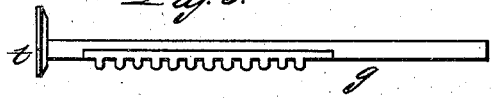

UNITED STATES PATENT OFFICE.

EDWIN CLARK, OF HARTFORD, CONNECTICUT.

SAUSAGE-MEAT CUTTER.

Specification of Letters Patent No. 3,723, dated August 31, 1844.

*To all whom it may concern:*

Be it known that I, EDWIN CLARK, of Hartford, in the county of Hartford and State of Connecticut, have invented a new and useful Machine for Cutting Sausage-Meat; and I do hereby declare that the following is a full, clear, and exact description of the construction and operation of the same, reference being had to the annexed drawings, making a part of this specification.

Figure 1 is a perspective view of the machine. A A, is the frame; (B) the crank by which motion is communicated to the machine; (m) beveled gear attached to the crank arbor inside of the frame and pitching into a corresponding gear of smaller size (f). This gives motion to the balance wheel (a) and the knives attached thereto (y y y y). The knives are made circular as seen in the drawing, the edges upon the outside of the circle; (n) a pinion attached to the crank arbor and set about an inch from the wheel (m) inside the frame; (d) a wheel of larger size which is led by the pinion (n) and placed inside the frame; (o) a pinion attached to the arbor with the wheel (d) and on the outside of the frame (Z) a wheel of 23 inches diameter placed on the outside of the frame. A pinion is attached to one end of the arbor for the purpose of driving the piston (g) and is connected therewith.

Fig. 2 is a plan of the wheel and pinion and (Fig. 3) a plan of the piston, the piston runs parallel with the frame the end (t) fitting snugly but freely into the box (L).

(Fig. 4) knives arranged parallel one across the other as seen in the drawing. The distance which they are placed from each other may correspond with the fancy of the maker, as it is evident the nearer they are together the finer the meat when pushed through. The knives are set in a frame made of iron and put into the end of the box (L) by means of a groove with the edges turned inside the box so as to face the end of the piston.

The operation is as follows: The meat to be cut is put into the box (L) Fig. 1, motion being given to the crank (B); the piston (g) pushes the meat through the knives (b) cutting it into squares, and as the wheel (m) is attached to the crank arbor it revolves with it, pitching into the wheel (f), turning the knives (y y y y) and balance wheel (a) the revolving knives are set as near as they will run without contact with the parallel, and cut the meat as it comes through diagonally. The piston-head (t) Fig. 3, fits into the box (L) Fig. 1, and is driven by the crank (B) from the pinion (n). Attached to that arbor and pitching into the wheel (d) the pinion (o) and wheel (Z) receive their motion from this wheel. (r) Fig. 2, a pinion taking into the rack (g) of the piston, by this arrangement of the wheel work a very slow and powerful motion is given to the piston it taking about 200 revolutions of the crank to drive the piston the length of the box.

Having thus fully described the construction and operation of my machine for cutting sausage meat, what I claim as my invention and desire to secure by Letters Patent is—

The combination of the revolving and parallel knives and in combination therewith the piston for forcing the meat through the parallel knives.

EDWIN CLARK.

Witnesses:
SUMNER SMITH,
S. N. CASE.